United States Patent Office 3,452,443
Patented July 1, 1969

3,452,443
GYROCOMPASSES
Richard J. Arthur, Charlottesville, Va., assignor to Sperry Rand Corporation, a corporation of Delaware
Filed June 9, 1965, Ser. No. 462,525
Int. Cl. G01c 19/38
U.S. Cl. 33—226                            5 Claims

ABSTRACT OF THE DISCLOSURE

A follow-up yoke carrying a gyrocompass card is journalled in a fixed housing and pitches and rolls with the craft. It directly supports horizontal axis journals of a vertical gimbal ring. The gyro sensitive element is journalled in the ring for oscillation about a normally vertical axis. The sensitive element includes a mechanical tilt sensitive ballistic mass mounted directly thereon for imparting meridian seeking torques to the sensitive element, these torques being about axes always in a horizontal plane (since they are generated by gravity) and thereby completely independent of the angular orientation of the gimbals during such pitching and rolling.

---

This invention relates to an improvement in miniaturized gyrocompasses of the reverse gimbal type where a follow-up ring is mounted to move in pitch and roll with the craft on which the instrument is used and may therefore be termed a deck-plane gyrocompass. U.S. Patent No. 2,692,441, issued Oct. 26, 1954, to L. F. Carter shows a reverse gimbal type of gyrocompass but wherein the compass is pendulously mounted in the usual roll and pitch isolation gimbals. As herein defined, a reverse gimbal gyrocompass is one in which the major axis of the gimbal is pivotally connected to the ring about a normally horizontal axis and the minor axis of the gimbal is pivotally connected to a liquid tight directive element about a normally vertical axis. The improved gyrocompass provides deck plane heading data of good accuracy for most classes of vessels including relatively small marine craft.

The improved gyrocompass combination eliminates the gimballing previously used between the spider or frame and craft to isolate the compass from the pitch and roll motions of the craft. The only pivot connections used in the improved combination between the craft or liquid tight binnacle and the directive element are the follow-up ring and the reverse gimbal. The binnacle of the improved combination is liquid tight to include a liquid in which the movable components are immersed and supported buoyantly with respect to the binnacle. As the components are buoyantly supported, and because the ballistic is on the directive element and because of the method of achieving damping, it has been found that it is unnecessary to mechanically isolate the directive element from the craft as previously required in types of gyrocompasses where the directive element was suspended vertically by a thin wire, and the collective assembly was hung pendulously by gimballing with respect to the craft.

The primary object of the present invention is to provide a simplified gyrocompass having a minimum number of components that will be competitive in cost and performance with other azimuth reading instruments.

A further feature of the invention resides in the inclusion in the described combination of components of a liquid tight level device immersed in the flotation liquid to tilt with the reverse gimbal having a gravity responsive liquid therein for orienting the directive element with the spin axis of the gyroscopic rotor thereof pointed north-south.

Another feature of the invention resides in the inclusion in the described combination of components of a gravity responsive means fixed to the directive element and immersed in the flotation liquid to provide damping.

Figure 1:
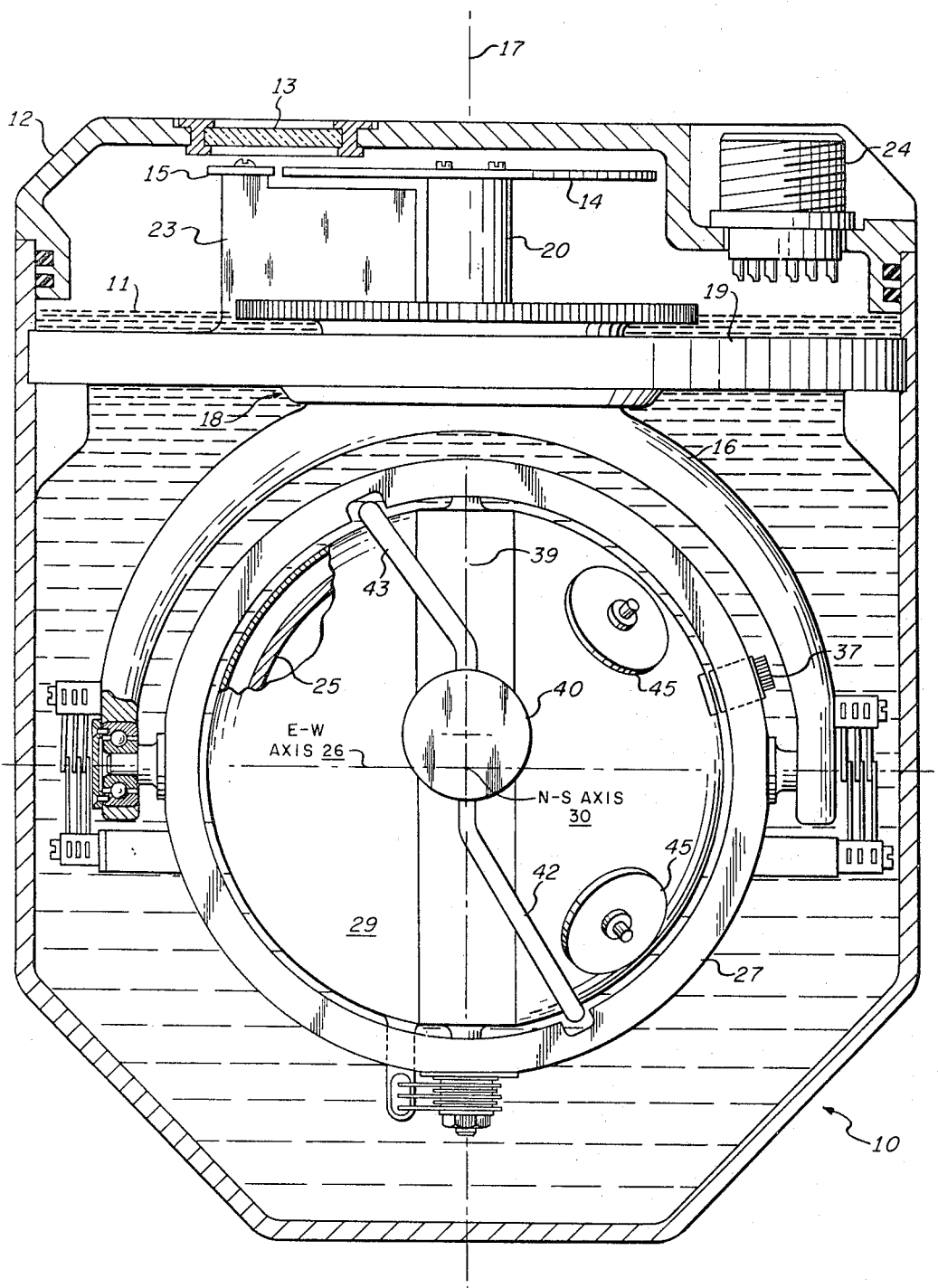
Figure 2:
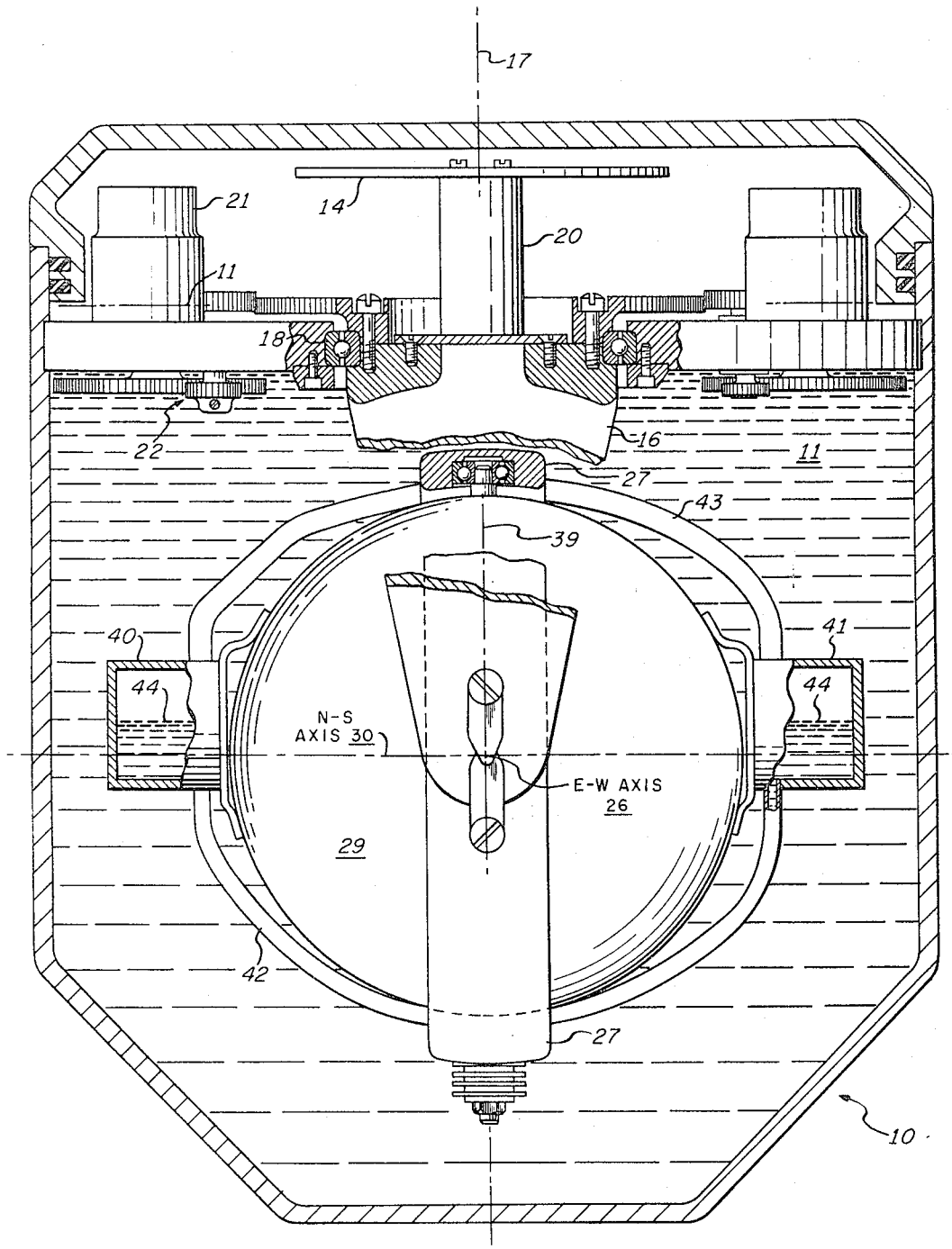
Figure 3:
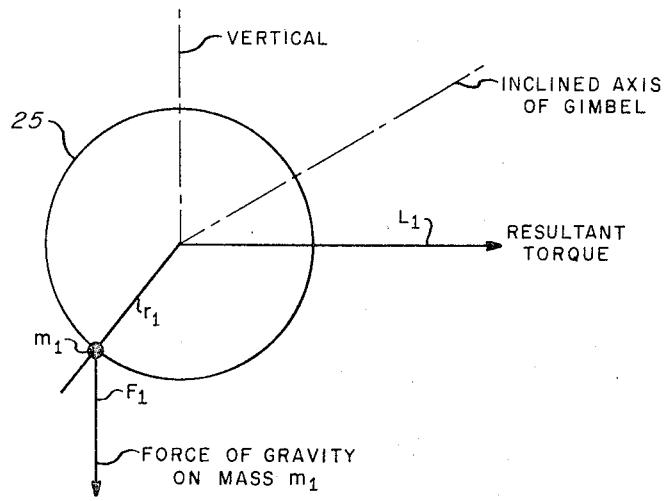
Figure 4:
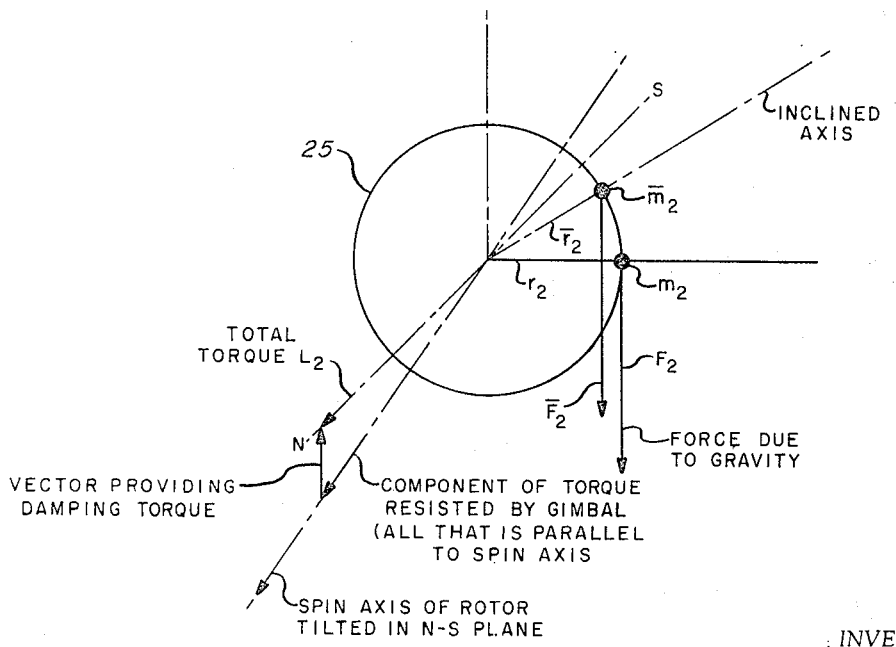

Other objects, features and structural details of the invention will be apparent from the following description when read in relation to the accompanying drawings wherein, FIG. 1 is an east-west elevation view of the improved gyrocompass with the binnacle and a part of the directive element being shown in cross section, FIG. 2 is a north-south elevation view of the instrument shown in FIG. 1 with the binnacle and a part of the reverse gimbal, the ring and the liquid tight tanks on the directive element being shown in cross section, FIG. 3 is a vector diagram referred to in describing the meridian seeking torque of the improved gyrocompass, and FIG. 4 is a vector diagram referred to in describing the damping torque of the improved compass.

As shown in the drawings, the improved gyrocompass includes a fluid tight binnacle 10 of miniature size that contains a suitable fluid 11 with flotation characteristics. The temperature of the liquid may be controlled by a conventional thermostat and heater means (not shown) to maintain it within a predetermined range independent of the temperature of the air external to the binnacle. The binnacle 10 is mounted on the craft on which it is used with the level of the fluid 11 above all of the components of the device except the compass card and follow-up motor. As shown, the binnacle 10 includes a cover 12 having a window 13 therein, FIG. 1, through which the heading of the craft is observed by the human pilot by comparing the relative positions of a compass card 14 and a lubber line 15.

In the improved gyrocompass, the first mounting component of the directive element is provided by a follow-up ring or yoke indicated at 16 that is pivotally connected to the binnacle 10 with freedom about a normally vertical axis 17 through a bearing 18 and a mounting plate 19 fixed to the binnacle, the gimbal being broken away in two places in FIG. 1 to show the main bearing support 18 as well as the upper bearing for the reverse gimbal 27. The card 14 is fixedly mounted on the top of an axially extending portion 20 of the ring 16. As shown in FIG. 1, the fixed lubber line 15 of the device is connected to the binnacle mounting plate 19 through a suitable bracket fastening 23. The follow-up structure of the improved compass includes motor 21 with a stator that is fixedly connected to the mounting plate 19 and a rotor that is operatively connected to the ring through reduction gearing indicated at 22 in FIG. 2. The binnacle cover 12 further includes an electrical plug 24 attached thereto as shown in FIG. 2 through which the electrical energy required to energize a suitable motor spinning the gyroscopic rotor of the directive element is supplied.

In the improved gyrocompass, the ring 16 is connected to the directive element through a reverse gimbal 27 whose major normally horizontal axis 26 is directed east-west.

The liquid tight directive element of the improved compass as indicated at 29 is a hollow spherical case having a gyroscopic rotor 25, FIG. 1, of the type shown in U.S. Letters Patent No. 2,886,897, issued May 1959 to Lennox F. Beach for Zenith Meridian Indicators. The case is preferably evacuated and partially filled with helium within which the rotor 25 driven by a conventional electrical motor (not shown) spins about a normally horizontal axis 30 directed north-south as indicated in FIG. 2. The directive element 29 is pivotally connected to the gimbal 27 about a normally vertical minor axis 39 that in the position of the components shown in FIGS. 1 and 2 coincides with the axis 17 of the follow-up ring 16.

To direct the rotor axis 30 of the element 29 north-south, the improved device includes means for applying a ballistic moment $M_B$ on said sensitive element and comprises, in the preferred embodiment, a pair of liquid tight tanks 40 and 41 of known structure mounted on the element 29 at equal radial distances along the north-south axis 30 from the east-west tilt axis 26. The tanks contain a liquid 44 therein with balancing level characteristics such as kerosene that is separate from the flotation liquid 11. The structure further includes closed piping 42 mounted on element 29 filled with the liquid 44 and connecting the tanks below the surface of the liquid. Closed piping 43 also mounted on the element 29 connects the tanks above the surface of the liquid 44 to equalize the pressure at the surface of the liquid. As shown in FIG. 3, the described structure provides a means for exerting a torque about a horizontal axis that depends on the influence of gravity on the liquid 44 in the tanks where the level of the liquid in one tank is above that of the level in the other tank. The directive torque is accordingly due to the slight motion of the liquid 44 from one to the other of the tanks due to the tilt of the spin axis under the influence of the Earth's rotation so that the mass of the liquid for the same liquid level is greater in the low tank than the high tank by the amount $(m_1)$. In the improved structure, the liquid 44 is the gravity responsive mass mounted directly on sensitive element 29 to tilt therewith that provides the directive or meridian seeking torque on the gyro. The level device, tanks and piping between the tanks of the means for directing the element 29 are immersed in the liquid 11 with the liquid 44 apart from the liquid 11. Mass $(m_1)$ is located at a radius $(r_1)$ from the center of the directive element and on the spin axis of the rotor. The force $(F_1)$ acting on the element 29 is due to action of gravity on mass $(m_1)$ and since gravity always acts in a vertical direction, the force $(F_1)$ is likewise always in a vertical direction. The resulting torque represented as a vector $(L_1)$ in FIG. 3 is therefore always exerted about a horizontal axis, regardless of any inclination of the gimbal to precess the spin axis in azimuth.

To damp the response of the element 29 to the directive torque, the improved gyrocompass includes means for applying a damping moment $M_D$ on said sensitive element and in the preferred embodiment comprises a gravity responsive means 45 directly mounted on the sensitive element. These masses produce a slight displacement of the center of gravity of the gyrosphere 29 to the west along the normally east-west axis. The damping mass may take the form of a plurality of discs, two of which are indicated at 45 in FIG. 1, that are fixed to the case 29 to exert a torque about the vertical axis of the element whenever the spin axis tilts about the E-W axis as will be described. The provided damping means unbalances the case 29 with respect to the axis 30 so that a continuous torque is exerted due to the influence of gravity thereon. As shown in FIG. 4, the discs 45 are represented as mass $(m_2)$ at a distance $(r_2)$ from N-S axis 30 along E-W axis 26. The force $(F_2)$ acting on the directive element due to the mass $(m_2)$ results from the effect of gravity and hence must always be in a vertical direction. This force $(F_2)$ with the east-west component of the distnce or lever arm $(r_2)$ produces a resultant torque vector represented at $(L_2)$ that must be horizontal and along the north-south axis 30. With the spin axis of the rotor of the directive element tilted however, the resultant torque has two components one along the spin axis and one along the tilted vertical axis and it is the latter horizontal component that provides damping. The gimbal 16 absorbs the component of the torque $(L_2)$ along the spin axis. With tilt of gimbal 16 about the spin axis, such as produced by rolling of the ship, the effective length of the torque arm $(\bar{r}_2)$ decreases in accordance with the cosine of the tilt angle causing a reduction in the magnitude of the damping torque without however changing its direction. This decrease is normally relatively small and insufficient to materially change the operating characteristics of the device up to angles as high as 45 degrees.

Thus in accordance with the teachings of the present invention, it will be noted that the ballistic force due to gravity is parallel to the local vertical and hence the axes of the resulting ballistic torques (which by definition are perpendicular to the applied force) must be in the horizontal plane regardless of the angular orientation of the yoke 16 as the craft pitches and rolls. Similarly, the axis of the total torque due to damping weights 45 is horizontal for the same reason and the damping component thereof depends only upon the location of the plane of the vertical ring 27 and not the location of the vertical axis 39 about the N-S axis 30. The damping torque is therefore substantially independent of the angular orientation of the yoke 16 as the craft pitches and rolls..

The follow-up means of the improved gyrocompass further includes an electrical pick-off 37 that produces an output depending on the angular displacement of reverse gimbal 27 and element 29 from a null condition with respect to the axis 39. As shown in FIG. 1, the stator part of pick-off 37 is fixedly mounted on gimbal 27 and the armature is fixedly mounted on the surface of the case 29 in an arrangement requiring gimbal axis 26 to be perpendicular to the rotor axis 30 and directed east-west. This relationship is maintained through operation of the motor 21 by the output of the pick-off 37 where the motor 21 is operatively connected to the stator of the pick-off through the follow-up ring 16 and the east-west gimbal 27.

The flotation liquid 11 of the improved gyrocompass is of such density as to relieve the weight of the sensitive element and its control factors on the horizontal E-W bearings and at least to a degree, the gimbal and ring on the bearings connecting the same to binnacle 10. In other words, the relative density of the displaced liquid and the components at the operating temperature of the instrument are such that the liquid provides buoyant support for the element 29 and the reverse gimbal 27 about the sensitive vertical and horizontal axes thereof. To obtain this result, the follow-up ring 16, the directive element or rotor case 29, the tanks 40, 41 and piping 42, 43 of the directive torquing means, the parts of the pick-off 37 and the damping torque means are immersed in the fluid 11.

The foregoing has demonstrated that a two gimbal, follow-up type gyrocompass may be constructed in such a manner as to eliminate all need for pendulously hanging the sensitive element in a separate gimbal system or including a pendulous support for the sensitive element within the instrument thereby greatly simplifying the overall compass mechanism and therefore reducing its size and cost without materially sacrificing its accuracy.

What is claimed is:
1. A gyrocompass for maneuverable vehicles subject to rolling and pitching movements comprising
   (a) a sensitive element including a rotor and rotor bearing case in which said rotor is mounted for spinning about a nominally horizontal N-S axis,
   (b) a reverse gimbal in which said sensitive element is journalled for rotation about a nominally vertical axis,
   (c) a yoke in which said reverse gimbal is journalled for rotation about a normally horizontal E-W axis,
   (d) a compass binnacle adapted to be directly supported on said vehicle whereby it takes part in the rolling and pitching thereof, and including bearing means in a fixed wall thereof for supporting said yoke for rotation about a normally vertical axis but subject to said rolling and pitching movements,
   (e) a compass follow-up loop including pick-off means responsive to relative displacement between said sensitive element and said gimbal, and servomotor means responsive thereto and coupled between said binnacle and said yoke for maintaining said relative displacement substantially zero, and (f) a ballistic mass mounted on said sensitive element and responsive to gravity upon tilt of said spin axis about said E-W axis for applying to said sensitive element a meridian seeking torque the axis of which is always horizontal regardless of the orientation of said yoke due to said rolling and pitching movements.

2. The gyrocompass as set forth in claim 1 wherein said ballistic mass comprises a pair of tanks partially filled with liquid mounted on opposite sides of said sensitive element and substantially aligned with said spin axis and coupled together with tubing having a fluid transmission characteristic such that the rate of transfer of fluid therethrough is slow compared with the rate of said rolling and pitching movements.

3. The gyrocompass as set forth in claim 1 further including damping means also mounted on said sensitive element and including a weight means having its effective mass positioned laterally from said first nominally vertical gimbal axis.

4. The gyrocompass as set forth in claim 1 wherein said binnacle comprises a closed housing substantially filled with a flotation fluid.

5. The gyrocompass as set forth in claim 1 further including a compass card connected to and positioned by said yoke whereby to provide a deck-plane indication of compass heading.

References Cited

UNITED STATES PATENTS

| | | |
|---|---|---|
| 1,923,885 | 8/1933 | Rawlings. |
| 2,854,850 | 10/1958 | Braddon. |
| 3,212,196 | 10/1965 | Carter _____ 33—226 |

FOREIGN PATENTS

| | | |
|---|---|---|
| 649,955 | 9/1928 | France. |

ROBERT B. HULL, *Primary Examiner.*